United States Patent [19]

Lee

[11] Patent Number: 5,667,728

[45] Date of Patent: Sep. 16, 1997

[54] BLOWING AGENT, EXPANDABLE COMPOSITION, AND PROCESS FOR EXTRUDED THERMOPLASTIC FOAMS

[75] Inventor: Shau-Tarng Lee, Oakland, N.J.

[73] Assignee: Sealed Air Corporation, Saddle Brook, N.J.

[21] Appl. No.: 739,704

[22] Filed: Oct. 29, 1996

[51] Int. Cl.[6] ................................................ C08J 9/14
[52] U.S. Cl. ................................ 252/350; 521/79; 521/97; 521/142; 521/143; 521/144; 521/910; 264/DIG. 5
[58] Field of Search ........................... 252/350; 521/79, 521/97, 142, 143, 144, 910

[56] References Cited

U.S. PATENT DOCUMENTS

| | | |
|---|---|---|
| 3,287,477 | 11/1966 | Vesilind . |
| 3,488,746 | 1/1970 | Gilbert . |
| 3,939,849 | 2/1976 | Baxter et al. . |
| 3,966,373 | 6/1976 | Johnson . |
| 4,154,785 | 5/1979 | Inui et al. . |
| 4,214,054 | 7/1980 | Watanabe et al. . |
| 4,649,001 | 3/1987 | Nakamura et al. . |
| 4,810,570 | 3/1989 | Rutten et al. . |
| 4,916,166 | 4/1990 | Suh et al. . |
| 5,153,913 | 10/1992 | Kandefer et al. . |
| 5,462,974 | 10/1995 | Lee ............................................ 521/79 |

*Primary Examiner*—Morton Foelak
*Attorney, Agent, or Firm*—Bell, Seltzer, Park & Gibson, P.A.

[57] ABSTRACT

An expandable thermoplastic composition is disclosed for extrusion foaming wherein the composition comprises a polyethylene resin and a blowing agent comprising ethane present in an amount of at least about 40 percent or more by weight based upon the total weight of the blowing agent and a different alkane selected from the group consisting of $C_1$, $C_2$, $C_3$, $C_4$, $C_5$, and $C_6$ alkanes and mixtures thereof, wherein the minimum percentage of ethane increases above 40 percent as the arithmetic mean carbon number of the different alkane increases from 3 to 5. A process for extrusion foaming of the composition is also disclosed.

6 Claims, No Drawings

BLOWING AGENT, EXPANDABLE COMPOSITION, AND PROCESS FOR EXTRUDED THERMOPLASTIC FOAMS

FIELD OF THE INVENTION

This invention relates to a blowing agent, an expandable composition for producing low density thermoplastic foams and a process for producing an expanded thermoplastic foam product of low density using an expandable thermoplastic composition. In particular, this invention relates to use of a blowing agent for incorporating into a plasticized thermoplastic resin for foaming by extrusion.

BACKGROUND OF THE INVENTION

Thermoplastic foam products can be produced by a wide variety of processes, of which extrusion is but one, that are in part responsible for the wide variety of foam products available today. Foams range in consistency from rigid materials suitable for structural use to flexible substances for soft cushions and packaging materials. These foams range in cellular formation from open or interconnecting cell foams to closed or unicell foams. The cell structure may range from large to fine. Electrical, thermal, mechanical, and chemical properties can be varied within wide limits depending on the thermoplastic resin composition and the method chosen to create the foam. Foamed thermoplastics range in density anywhere from about 10 $kg/m^3$ to over 1,000 $kg/m^3$, although the latter perhaps more properly are called microcellular structures. True foams are considered to have a density of less than about 800 $kg/m^3$.

Many methods have been developed for the manufacture of foamed thermoplastics, which generally can be classified into three groups: 1) methods for adding a gaseous "blowing agent" to the thermoplastic during processing, 2) methods for producing a gaseous blowing agent in the thermoplastic during processing, and 3) methods for forming a thermoplastic mass from granules to obtain a cellular structure. Similar blowing agents sometimes are used in the various methods to produce foams. However, the effectiveness of a particular blowing agent varies considerably depending on the thermoplastic resin composition, the method chosen, the process conditions, the additives used, and the product sought.

Blowing agents work by expanding a thermoplastic resin to produce a cellular thermoplastic structure having far less density than the resin from which the foam is made. Bubbles of gas form around "nucleation sites" and are expanded by heat or reduced pressure or by a process of chemical reaction in which a gas is evolved. A nucleation site is a small particle or conglomerate of small particles that promotes the formation of a gas bubble in the resin. Additives may be incorporated into the resin to promote nucleation for a particular blowing agent and, consequently, a more uniform pore distribution.

However, the foam is maintained by replacing the blowing agent in the cells with air. Diffusivity of the blowing agent out of the cells relative to air coming into the cells impacts the stability of the foam over time and whether the cells of the foam may collapse. Additives may be incorporated into the resin and process conditions may be adjusted to assist in controlling the diffusivity of the blowing agent, to promote foam stability, and to limit collapse of the foam to acceptable limits.

Methods for producing a blowing agent in situ usually involve a chemical reaction that evolves gas. Polyethylene, silicone, epoxy, and vinyl foams have all been produced by adding a substance that will produce a gaseous blowing agent chemically. For example, dinitroso compounds and hydrazides, which evolve nitrogen gas on decomposition, and bicarbonates, which evolve carbon dioxide, have been added to thermoplastic resins to produce foams.

Polystyrene foams often are produced by "bead molding," in which partially expanded granules or beads are heated in a mold in the presence of a blowing agent to expand and fuse the particles into a rigid unicellular structure. A volatile organic compound or some other gaseous blowing agent is impregnated into the beads. Heat is applied and the pressure is released to cause the beads to expand and fuse.

There are several methods for adding a blowing agent to a thermoplastic resin during processing to produce a foam. Ureaformaldehyde and polyvinylformaldehyde foams have been produced by whipping air into a heated thermoplastic mass before it sets. Polyolefinic foams have been produced by introducing air or some other gas or volatile solvent into a heated thermoplastic polyolefin mass and then heating the mass or reducing pressure to expand the gas and form pores of a desirable size. One more specific method is to impregnate a thermoplastic resin with blowing agent under heat and pressure in a closed vessel. The pressure is released to expand the blowing agent to form "prefoamed," or partially expanded, beads. Prefoamed beads usually are further expanded in an enclosed vessel such as a mold to produce a molded foam product.

Another more specific method, to which the invention claimed herein relates, is to mix the blowing agent with molten resin under pressure and then extrude the mixture through a forming die into a zone of reduced pressure. Shaped extruded foams can be produced by this method using a forming die of particular configuration. Plank, which can be cut to a desirable shape, and thin foam sheets are produced in this manner.

Many of the halogenated hydrocarbons have been used for several years as blowing agents in various methods for producing foams from thermoplastic resins. The halogenated hydrocarbons include the chlorofluorocarbons ("CFCs") and hydrochlorofluorocarbons ("HCFCs"). CFCs and HCFCs are readily impregnable in thermoplastic resins and are readily expandable under relatively mild conditions. CFCs and HCFCs generally produce foams of high quality with a minimum of processing difficulty. The pore size is controllable, the foam has good stability with minimum tendency to collapse after a period of time, and the surface characteristics of the foam are smooth and desirable. Also, CFCs, HCFCs, and other halogenated hydrocarbons typically are either not flammable or are of low flammability, which greatly reduces the care with which they may be used. These compounds have the further advantage of low toxicity. However, governmental regulation is phasing out use of many halogenated hydrocarbons because the halogenated hydrocarbons may be responsible for damage to the earth's ozone layer.

Producers of thermoplastic foam products have been seeking alternatives to CFC and HCFC blowing agents for a number of years to reduce or eliminate altogether the amount of halogenated hydrocarbons used. A number of volatile organic compounds (VOCs) have been proposed, although many of these also are somewhat objectionable. VOCs include the light aliphatic hydrocarbons such as propane, n-butane, isobutane, butylene, isobutene, pentane, neopentane, and hexane, to name but a few. The diffusivity of VOCs can be many times faster than that of the halogenated hydrocarbons and harder to control. Foam collapse and stability problems have been encountered, although high quality foams can be produced using VOCs. Also, VOCs typically are flammable, thus presenting handling problems and safety concerns.

Inert gases have also been proposed as blowing agents, although these sometimes do not provide acceptable results, especially for producing extruded foams. Inert gases include nitrogen, argon, xenon, krypton, helium, and carbon dioxide. Nitrogen and carbon dioxide, in particular, have the advantage of being inexpensive, readily available, and of not being flammable, and are not considered to be harmful to the earth's ozone layer. However, inert gases usually are not as readily soluble in thermoplastic resins as CFCs, HCFCs, and VOCs, are of higher volatility, and do not reduce the viscosity of the resin. Lubricants often are added to the resin for extrusion foaming. The range of processing conditions for producing acceptable products is narrower than for CFCs, HCFCs, and VOCs. Mixing the resin with an inert blowing agent and keeping the inert blowing agent in the resin is more complicated than for CFCs, HCFCs, and VOCs. The surface texture of extruded foams sometimes is rough. Extruded low density foams and thick foams are difficult to achieve. The foam sometimes has poor stability and foam shrinkage sometimes is uncontrollable.

Extrusion foaming is a continuous process in which a plasticized thermoplastic resin is cooled and expanded when the resin and blowing agent are extruded into a zone of lower pressure. Mixing of blowing agent with polyethylene resin for extrusion foaming can take place in as little as a few minutes or less because the resin is plasticized. Nucleating and stability control agents typically are used in extrusion foaming, even for CFC and HCFC blowing agents, to control cell formation, diffusivity of the blowing agent, and stability of the foam. No dispersion medium for the polymer particles is usually needed or used for extrusion foaming.

As an example of extrusion foaming, Watanabe et al. U.S. Pat. No. 4,214,054 disclose numerous volatile organic blowing agents including various CFCs, VOCs, and the use of decomposable gas-releasing chemical blowing agents for producing extruded polyolefin foams from particular resin compositions.

Nakamura et al. U.S. Pat. No. 4,649,001 propose preparing long, thin sheets of low density polyethylene foams by extruding a resin mixture of low density polyethylene and linear low density polyethylene. The extruded foam sheet is drawn at a rate faster than the extrusion rate to produce long, thin sheets. Foaming agents are said to include inorganic gases such as carbon dioxide and a number of VOCs and HCFCs. No specific blends of blowing agents are suggested.

Johnson U.S. Pat. No. 3,966,373 proposes a method and apparatus for making relatively dense structural foam profiles having a foam core and a dense skin. A partially expanded extruded thermoplastic polymer composition is conveyed through a chilled shaping passage moving at the same rate as the foam to eliminate friction. The dense skin is formed by the chilled passage while the polymer resin is still expanding. Foaming agents are said to include nitrogen, carbon dioxide, lower molecular weight paraffins such as propane, butane, and methylchloride, lower molecular weight olefins such as ethylene, propylene, and butylene or mixtures of the above. No specific mixtures of foaming agents are disclosed. A preferred thermoplastic composition for extrusion to form tongue depressors or ice cream sticks of 320 to 1000 kilograms per cubic meter is disclosed to include polystyrene beads having a pentane blowing agent integrated therewith.

An alternative blowing agent for extruded thermoplastic foams, a process for producing extruded foams using such a blowing agent, and a thermoplastic resin composition containing such a blowing agent would be desirable that avoid or substantially reduce the impact of the problems typically associated with CFCs, HCFCs, VOCs, and inert gases in producing extruded foams and are capable of producing foams having acceptable pore structure, density, and stability.

SUMMARY OF THE INVENTION

The invention relates to a blowing agent for extrusion foaming of relatively low density polyolefin foams wherein the blowing agent comprises specified proportions of ethane and a different hydrocarbon selected from among the $C_1$ to $C_6$ alkanes and mixtures of any two or more or all of these hydrocarbons. This blowing agent substantially reduces the problems associated with inert gas blowing agents, VOCs, CFCs, and HCFCs.

It has been discovered that a thermoplastic composition containing the ethane and alkane blend of blowing agents disclosed herein produces extruded polyolefin foams in which the blowing agent substantially does not burn, thereby reducing the flammability problems associated with VOCs. The blowing agent also produces foams having the requisite pore structure, density, and dimensional stability. Dimensional variation is reduced compared to propane and butane foams. Corrugation is acceptable. Stable foam densities can be achieved of from at least about 15 to 50 kilograms per cubic meter or more, up to about 100 kilograms per cubic meter. Nucleation, cell size, and cell distribution can be controlled with the blowing agent, thus substantially reducing or eliminating the need for typical nucleating agent additives, including talc and zinc oxide. Typically, less aging modifier is required than for a propane or butane blowing agent.

In additional aspects, the blowing agent for extrusion foaming of polyolefin foam products is a blend of ethane and an alkane selected from the group consisting of methane, fluorinated ethane, propane, fluorinated propane, the butanes, the pentanes, the hexanes, and a mixture of any two or more or all of these hydrocarbons. Fluorinated hydrocarbons have not yet been subject to regulation in the same manner as CFCs and HCFCs. Fluorinated ethane and fluorinated propane are somewhat less volatile than ethane and propane, respectively, but are useful in the practice of the invention. However, fluorinated alkanes of carbon number 4 and higher typically are not of sufficient volatility and are otherwise somewhat problematic for use as blowing agent components in connection with the practice of the invention.

For $C_3$ to $C_6$ alkanes, for which flammability problems have been encountered, the ethane should be present in an amount sufficient to substantially reduce the flammability of the blowing agent. For $C_2$ alkanes other than ethane, and for fluorinated ethane in particular, the ethane should be present in an amount sufficient to substantially reduce requirements for the typical nucleating agent additives. For $C_1$ alkanes, which have low solubility and reduced permeability in the resin in comparison to ethane, the $C_1$ alkane should be present in the blowing agent in an amount that does not adversely impact nucleation.

Typically, ethane should be present in an amount of from at least about 40 to 60 percent or more by weight based upon the total weight of blowing agent. Ethane should normally be present in the blowing agent in an amount by weight based on the total weight of the blowing agent of from at least about 40% for a $C_3$ alkane and a $C_2$ alkane other than ethane, 50% for a $C_4$ alkane, 60% for a $C_5$ or $C_6$ alkane, and 95% for a $C_1$ alkane. Various combinations of $C_1$ to $C_6$ alkanes are contemplated in which at least 40 to 60 percent or more of the blowing agent comprises ethane and no more than about five percent of the blowing agent, if any, comprises $C_1$ alkane.

The expandable composition of the invention for producing extruded polyolefin foam products having dimensional stability is a plasticized polyolefin resin mixed with a blowing agent as above described. The expandable composition may contain an aging or diffusivity modifier and a nucleation agent for controlling the size of the cells of the foam, as deemed necessary.

In additional aspects of the invention, the expandable composition includes a polyethylene resin, about 0.3 to 5 kilograms of glycerol monostearate per 100 kilograms of the resin, about 0.05 to 0.5 kilograms of zinc oxide or talc per 100 kilograms of the resin, and about 1 to 20 kilograms of blowing agent per 100 kilograms of the resin.

The invention also relates to a process for producing an expanded polyolefin foam wherein the blowing agent is mixed with a plasticized polyolefin resin and then extruded through an extruder to produce the foamed polyolefin product.

Thus, the invention includes ethane and methane, ethane and propane, and ethane and butane blowing agents, among others, that substantially reduce the flammability hazards typically associated with VOCs during foam production, curing, and converting operations, including perforating, slitting, and laminating.

DETAILED DESCRIPTION

Various processes and equipment for extrusion foaming of thermoplastic resins have been used for many years. Generally, solid pellets of thermoplastic resin are fed through a hopper to a melting zone in which the resin is melted, or plasticized, to form a flowable thermoplastic mass. The plasticized thermoplastic mass generally is then metered to a mixing zone where the thermoplastic mass is thoroughly mixed with a blowing agent under pressure for subsequent cooling and expansion of the resin to form a foam. Blowing agent typically is injected between the metering and the mixing zones. The blowing agent can be injected through a single port or multiple ports. Multiple ports can be used for different blowing agent components or the components can enter through a single port. The mixture of thermoplastic resin and blowing agent is then forced through a die, which imparts a shape to the thermoplastic mass, into a zone of lower pressure, such as atmospheric pressure. The blowing agent expands to form the cells of the foam and the thermoplastic foam is cooled.

Typical of much of the equipment used for extrusion of thermoplastic foams, the thermoplastic pellets are conveyed from a hopper through the melt zone and the mixing and cooling zones, and is then extruded through the die by a screw type apparatus. Single screw extruders are common, although double screw extruders sometimes are used for greater mixing. Double screw extruders can be either twin screw, in which the resin passes through two screws in parallel, or tandem screws, in which the resin passes through two screws in series.

When a blowing agent is injected into the mixing zone of the screw extruder, the blowing agent initially forms a dispersion of insoluble bubbles within the plasticized thermoplastic mass. These bubbles eventually dissolve in the thermoplastic mass as the mixing continues and the pressure increases down the length of the extruder. The extruder should have a length to diameter ratio of at least 30:1 and a sufficient length of mixing zone to ensure that proper mixing occurs.

Thermoplastic resins contemplated for use in the practice of the invention claimed herein include the polyolefin resins. Polyolefin resins may be defined as polymers derived from unsaturated hydrocarbons containing the ethylene or diene functional groups. Polyolefin resins may include virtually all of the addition polymers, however, the term polyolefin typically is used for polymers of ethylene, the alkyl derivatives of ethylene (the alphaolefins), and the dienes. Among the more commercially important polyolefins are polyethylene, polypropylene, polybutene, and their copolymers. Polyethylene resins are particularly useful in the practice of the invention claimed herein.

Polyethylene is a whitish, translucent polymer of moderate strength and high toughness. Polyethylene is available in forms ranging in crystallinity from 35 to 95 percent. Polyethylene is available in low, medium, and high density polymer forms. For the low density material, the softening temperature is about 105° C. to 115° C. For the high density material the softening temperature is some 25° C. to 40° C. higher, or from about 130° C. to 140° C. Low, medium, and high density polyethylenes are suitable for extrusion foaming, including mixtures thereof.

The thermoplastic resin should be maintained at a temperature within a range above the melting point of the polymer that is sufficiently high so that the polymer has sufficient fluidity for mixing with blowing agent. This range normally will be from about 20° C. to 100° C. above the melting point of the resin. The melting zone can be maintained at a somewhat lower temperature due to the heat that is generated by friction as the plasticized resin flows through the extruder.

After mixing, the temperature of the mixture of resin and blowing agent should be lowered closer to the melting point of the mixture so that the polymer maintains its structure upon foaming, but not so much that complete expansion is hindered. The blowing agent has a plasticizing effect on the resin reducing its viscosity, or resistance to flow, and so the melting point of the mixture of resin and blowing agent normally is below that of the resin alone. The expansion temperature, which is above the melting point of the mixture, is empirically determined and depends upon the composition of the resin, the length of the screw, whether single or double screws are used, on the specific resin, upon the amount of blowing agent, and the specific blowing agent blend. For a low density polyethylene, the expansion temperature will generally be in the range of from about 85° C. to 120° C.

The blowing agent contemplated for use in practicing the invention comprises ethane and a different hydrocarbon selected from the group consisting of $C_1$, $C_2$, $C_3$, $C_4$, $C_5$, and $C_6$ alkanes, and mixtures thereof. Typically, ethane should be present in an amount by weight of at least about 40 percent by weight of the total blowing agent. At least 40 percent ethane in the blowing agent substantially reduces flammability as compared to $C_3$ to $C_6$ alkanes, promotes desirable nucleation, and can substantially eliminate typical nucleation additives, if desired.

The proportion above 40 percent of ethane depends upon the alkane or alkanes present in the blend. Ethane should be present in the blend in an amount by weight of at least about 40% by weight or more for a $C_2$ or $C_3$ alkane other than ethane, 50% by weight or more for a $C_4$ alkane, and 60% by weight or more for a $C_5$ or $C_6$ alkane. If no other alkanes are present other than ethane, methane, and insubstantial amounts of other alkanes, the blowing agent should comprise at least about 95% ethane. Ethane can be present in any of the blowing agents of the invention in greater amounts up to about 99%.

Various combinations of $C_1$ to $C_6$ alkanes are contemplated in which at least 40 to 60 percent of the blend or more comprises ethane. From the $C_2$ to the $C_6$ alkanes, the relationship is approximately linear between the minimum amount of ethane in the blowing agent and the arithmetic mean carbon number of the other alkanes present, from about 3 to 5. Accordingly, when the arithmetic mean carbon number of alkanes other than ethane is about 2 to 3, then ethane should be present in an amount of at least about 40% by weight based upon the total weight of the blowing agent. When the arithmetic mean carbon number is about 4, then ethane should be present in an amount of at least about 50% by weight based upon the total weight of the blowing agent. When the arithmetic mean carbon number is about 5 to 6, then ethane should be present in an amount of at least about 60% by weight based upon the total weight of the blowing agent. Small amounts of $C_1$ alkane present in the blowing agent should not significantly increase the minimum amount of ethane present in the blowing agent. Frequently, small amounts of methane, up to about 2 or 3 percent, may be present in ethane as an impurity.

The $C_1$ to $C_6$ alkanes other than ethane that are suitable components for the blowing agent include, but are not limited to, methane, fluorinated ethane, propane, fluorinated propane, the butanes, the pentanes, the hexanes, and mixtures thereof. Fluorinated butane and fluorinated alkanes of higher carbon number are typically of too low volatility to be useful components of the blowing agent according to the invention. However, it should be recognized that minor proportions of these and other alkanes can be present and that the benefits of the invention should still be available.

The blowing agent is mixed into the plasticized polyethylene polymer resin in proportions to achieve the desired degree of expansion in the resulting foamed cellular product. Stable foam densities from 50 kg/m$^3$ down to as low as 15 kg/m$^3$ may be made by practice of the invention. Stable foams of higher density, up to about 100 kg/m$^3$, can also be produced, if desired. Typically, higher densities are produced by reducing the amount of blowing agent that is mixed with the resin. Densities of from about 20 to 40 kg/m$^3$, and especially from 20 to 30 kg/m$^3$, are somewhat more typical.

The blowing agent disclosed herein is sometimes referred to as a "blend" of different components. It should be understood that the blowing agent components can be added to the resin in any of several ways. The term "blend" as used herein is intended to refer to the blowing agent disclosed herein, no matter how the components are added to the resin.

The ethane and other alkane components can be mixed and injected through a single port at sufficient pressure to avoid cavitation, or vapor lock, in the blowing agent pumps. The ethane and other alkane components can be pumped at different conditions to a single port on the extruder. A tee can be used to join the blowing agent streams prior to injection through the port. The ethane and other alkane components can be separately injected into the resin through different ports. Separate injection allows for independent control over the rate of injection of each component and can be useful in optimizing the blowing agent blend and quantity.

The blowing agent generally is mixed with the resin in a ratio of about one and one half or one and two tenths parts or less of blowing agent to ten parts of resin. The maximum useful proportion of blowing agent in the plasticized resin is affected by the pressure that is maintained on the resin in the extrusion die passage, as is believed to be well known to the skilled artisan.

The benefits of using the blowing agent of the invention claimed herein may be enhanced by using a combination of a nucleation agent and an aging modifier to control cell size and development and to control the replacement of blowing agent with air in the cells of the foam, respectively. In particular, it has been found that a combination of low levels of nucleation agent, such as zinc oxide or talc, and glycerol monostearate aging modifier is useful to further reduce the density of the foams produced and results in a thickness increase.

The glycerol monostearate is mixed with the polyethylene resin prior to melting in an amount sufficient to produce a desirable rate of exchange of air with blowing agent in the cells of the foam. The glycerol monostearate is mixed with the polyethylene resin prior to melting in an amount from about 0.3 to 5 kg per 100 kg of polyolefin resin. Glycerol monostearate may be added in an amount of about 0.3 to 1.5 kg per 100 kg of polyolefin resin. Typically, less glycerol monostearate is needed than for foams prepared with, for example, an all butane blowing agent.

Nucleation agent is mixed with the resin in an amount sufficient to promote nucleation and to develop a pore structure of the desired size. Nucleation agent is mixed with the resin in an amount of from about 0.05 to 0.5 kg per 100 kg of polyolefin resin. Zinc oxide or talc may be added to the resin in an amount of 0.1 kg per 100 kg of polyolefin resin.

However, it should be understood that talc or zinc oxide nucleation agent need not necessarily be used in connection with the practice of the invention. Methane and ethane are more volatile than VOC's of higher carbon number and have higher diffusivity in resin. Methane and ethane behave more as gases than liquids at extrusion conditions and do not always need a nucleation agent to cause nucleation of the blowing agent within the resin. Blowing agent in accordance with the invention, comprising ethane and $C_2$ to $C_6$ alkanes and including, if present, a small amount of $C_1$ alkane, up to about 5% by weight of the total weight of the blowing agent, can be used to control cell size and distribution.

The following Table 1 compares the results achieved using various examples of the blowing agent of the present invention to examples of 100 percent butane blowing agent and 100 percent ethane blowing agent. In all cases, the resin is a low density polyethylene of melt index 2 and a density of 0.918 g/cm$_3$. The resin was supplied at the rate of 205 kg/hr on a tandem extrusion system in which the primary extruder has a diameter of 11.4 cm and the secondary extruder has a diameter of 15.2 cm. The tandem extruder provides somewhat better melting of resin and mixing of blowing agent and resin than a single screw extruder.

Glycerol monostearate was injected at the rate of 2.7 kg/hr. A zinc oxide nucleation control agent was mixed with the resin at the rate of 0.1 kg/hr.

The extruder was equipped with one port for the injection of ethane and $C_1$ to $C_6$ blowing agents. Ethane behaves as a gas and can result in vapor lock in the pumps that are used to inject the blowing agent into the resin. Ethane was vaporized by heating it to 54 degrees Centigrade, which is above the critical temperature for ethane of 31 degrees. A high pressure system was used to deliver the ethane as a supercritical fluid to a tee where the ethane stream joined a separate butane stream in those examples where an additional alkane was used. The blowing agent was fed to the primary extruder. Ethane and butane blowing agent was added at the flow rates shown in Table 1.

Foam results are as follows:

TABLE 1

| Ethane Kg/hr | Butane Kg/hr | Thickness mm | Density Kg/m³ | Corrugation | Flammability |
|---|---|---|---|---|---|
| 0 | 36.2 | 3.3–3.4 | 19 | Normal | Burned Readily |
| 12.8 | 0 | 3.3 | 24.6 | Flat | Self-Extinguishing |
| 13.0 | 0 | 3.3 | 22.4 | High | Self-Extinguishing |
| 11.9 | 0 | 3.2 | 25.6 | Flat | Self-Extinguishing |
| 11.8 | 3.9 | 3.3–3.4 | 20 | Normal | Self-Extinguishing |
| 13.0 | 0 | 1.5 | 29.6 | High | Self-Extinguishing |
| 11.9 | 4.5 | 1.5–1.6 | 22 | Normal | Self-Extinguishing |

As shown in Table 1, all of the foams produced in accordance with the invention were of normal, acceptable corrugation. The foam produced with pure butane burned readily. The all butane blown foam produced a blue flame characteristic of burning butane blowing agent. Foams produced with pure ethane blowing agent and with blends of ethane and butane blowing agent exhibited some shrinkage when exposed to flame, but did not pick up flame and were self-extinguishing.

Table 2, below, shows additional examples of foams made with the blowing agent blend of the invention. These examples are prepared in the same manner as the Table 1 examples, except that glycerol monostearate was added to the resin at a rate of 1.56 kg/hr and no nucleating agent was used.

TABLE 2

| Ethane Kg/hr | Butane Kg/hr | Secondary, Melt °C. | Die Pres. psi | Density Kg/m³ | Gauge mm |
|---|---|---|---|---|---|
| 12.7 | 4.9 | 109.4 | 1230 | 23 | 1.65 |
| 12.7 | 4.9 | — | — | 19 | 1.83 |
| 12.3 | 4.0 | 109.4 | 1150 | 20.5 | 3.28 |
| 12.3 | 4.1 | 110.0 | 1190 | 18.7 | 3.35 |
| 11.8 | 2.8* | 110.6 | 1240 | 21.4 | 3.20 |
| 11.8 | 2.8* | 110.0 | — | 22.2 | 2.54 |

*Propane

The following Tables 3 and 4 compare the dimensional stability of foams produced with the blowing agent of the invention to foams produced with a butane blowing agent. Table 3 shows the variation in foam gauge over 9 days for the foam of Table 2 in which ethane is supplied at the rate of 12.3 kg/hr and butane is supplied at the rate of 4.1 kg/hr. Table 4 shows gauge variation over 13 days for the foam of Table 1 made with an all butane blowing agent. As can be seen, the presence of a substantial portion of ethane reduces gauge variation over time for foam made in accordance with the invention, as compared to a butane blown foam. The ethane and alkane blowing agent of the invention is less sensitive to winder tension, which is the tension that is exerted on the foam when rolled, and shows less gauge variation when the foam is placed under tension than does an all butane blown foam. Thus foam made in accordance with the invention shows quality benefits over foam produced with an all butane blowing agent.

TABLE 3

| Days After Made | Outside mm | Middle mm | Core mm | Variation |
|---|---|---|---|---|
| 1 | 3.45 | 3.23 | 2.98 | 0.47 |
| 2 | 3.40 | 3.15 | 2.87 | 0.53 |
| 3 | 3.50 | 3.00 | 2.92 | 0.58 |
| 9 | 3.35 | 2.95 | 2.87 | 0.48 |

TABLE 4

| Days After Made | Outside mm | Middle mm | Core mm | Variation |
|---|---|---|---|---|
| 7 | 3.53 | — | 2.81 | 0.72 |
| 13 | 3.66 | 0 — | 3.05 | 0.61 |

Table 5, below, compares the flammability of an all butane blown foam with that for a foam blown with a 50/50 blend of propane and ethane, by weight based on the total weight of the blowing agent. The foams were prepared in the same manner as for Example 1, except that a 68 mm counter rotating twin screw extruder was used for the last three examples. The extruder had two injection ports. Ethane was injected into the resin through a separate injection port to facilitate independent flow control of the ethane component.

TABLE 5

| Butane % | Propane % | Ethane % | Aging Days | Thickness mm | Density Kg/m³ | Burned Area cm² |
|---|---|---|---|---|---|---|
| 16 | 0 | 0 | 90 | 4.6 | 17.6 | 3.6 |
| 16 | 0 | 0 | 90 | 7.1 | 20 | 5.3 |
| 17.5 | 0 | 0 | 0 | 2.5 | 20.5 | 81* |
| 0 | 3 | 3 | 0 | 2.1 | 38.4 | 5.0 |
| 0 | 3 | 3 | 0 | 1.9 | 46.4 | 3.6 |
| 0 | 3 | 3 | 0 | 1.8 | 48 | 41.0 |

*Completely burned out; circular sample with 10.16 cm diameter

As shown in Table 5, foams produced with butane blowing agent require significant aging to reduce their flammability to levels comparable to foams produced with ethane and $C_1$ to $C_6$ alkane. Without a significant aging period, the butane foam is completely consumed when exposed to flame.

The invention claimed herein has been described above with respect to particular preferred embodiments. These embodiments should be considered illustrative of and not in limitation of the invention claimed herein. The full scope of the invention should be judged in accordance with the appended claims and equivalents thereto.

What is claimed is:

1. A blowing agent for expanding an extrudable, expandable polyolefin foam product, said blowing agent comprising ethane and a different alkane selected from the group consisting of $C_1$, $C_2$, $C_3$, $C_4$, $C_5$, and $C_6$ hydrocarbons and mixtures thereof, said ethane being present in said blowing agent in an amount of at least about 40 percent by weight based upon the total weight of said blowing agent.

2. The blowing agent of claim 1 wherein said $C_1$, $C_2$, $C_3$, $C_4$, $C_5$, and $C_6$ alkanes are selected from the group consisting of methane, fluorinated ethane, propane, fluorinated propane, n-butane, isobutane, the pentanes, the hexanes, and mixtures thereof.

3. The blowing agent of claim 1 wherein the percentage of ethane increases as the arithmetic mean carbon number increases from 3 to 5 in the alkane selected from the group consisting of $C_1$, $C_2$, $C_3$, $C_4$, $C_5$, and $C_6$ alkanes and mixtures thereof.

4. The blowing agent of claim 1 wherein when said alkane selected from the group consisting of $C_1$, $C_2$, $C_3$, $C_4$, $C_5$, and $C_6$ alkanes is $C_4$ alkane, then said ethane is present in an amount of at least about 50 percent by weight or more of the total blowing agent.

5. The blowing agent of claim 1 wherein when said alkane selected from the group consisting of $C_1$, $C_2$, $C_3$, $C_4$, $C_5$, and $C_6$ alkanes is $C_5$ to $C_6$ alkane, then said ethane is present in an amount of at least about 60 percent by weight or more of the total blowing agent.

6. A blowing agent for expanding an extrudable, expandable polyolefin foam product, said blowing agent comprising ethane and an alkane selected from the group consisting of $C_1$, $C_2$, $C_3$, $C_4$, $C_5$, and $C_6$ hydrocarbons and mixtures thereof, wherein said $C_1$ alkane is present in an amount of from about 0 to 5% by weight of the total blowing agent in said resin, wherein when the arithmetic mean carbon number in the alkane component of the blowing agent, excluding ethane, is about 2 to 3, then said ethane is present in an amount of at least about 40 percent by weight or more of the total blowing agent in said resin, wherein when the arithmetic mean carbon number in the alkane component of the blowing agent is about 4, then said then said ethane is present in an amount of at least about 50 percent by weight or more of the total blowing agent in said resin, and wherein when the arithmetic mean carbon number in the alkane component of the blowing agent is about 5 to 6, then said ethane is present in an amount of at least about 60 percent by weight or more of the total blowing agent in said resin.

* * * * *